(12) United States Patent
Chang et al.

(10) Patent No.: US 11,988,890 B2
(45) Date of Patent: May 21, 2024

(54) FIXED FOCUS LENS

(71) Applicant: YOUNG OPTICS INC., Hsinchu Science Park (TW)

(72) Inventors: Shuo-Chieh Chang, Hsinchu Science Park (TW); Yi-Hsueh Chen, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 788 days.

(21) Appl. No.: 16/779,046

(22) Filed: Jan. 31, 2020

(65) Prior Publication Data

US 2020/0249418 A1 Aug. 6, 2020

(30) Foreign Application Priority Data

Feb. 1, 2019 (TW) .................................. 108104182

(51) Int. Cl.
| G02B 3/02 | (2006.01) |
| G02B 7/04 | (2021.01) |
| G02B 13/18 | (2006.01) |
| G02B 13/04 | (2006.01) |
| G02B 13/16 | (2006.01) |

(52) U.S. Cl.
CPC ............... *G02B 7/04* (2013.01); *G02B 13/18* (2013.01); *G02B 13/04* (2013.01); *G02B 13/16* (2013.01)

(58) Field of Classification Search
CPC ... G02B 7/04; G02B 9/08; G02B 9/64; G02B 13/16; G02B 13/18; G02B 13/04; G02B 13/22

USPC .................................................. 359/642–830
See application file for complete search history.

(56) References Cited

U.S. PATENT DOCUMENTS

| 6,989,946 B2 * | 1/2006 | Kobayashi ............. G02B 13/22 |
| | | 359/755 |
| 8,964,096 B2 | 2/2015 | Katou et al. |
| 2008/0013192 A1 | 1/2008 | Bretthauer |
| 2009/0273851 A1 * | 11/2009 | Take ................... G02B 15/1461 |
| | | 359/755 |
| 2010/0157444 A1 * | 6/2010 | Wang ..................... G02B 13/16 |
| | | 359/716 |
| 2015/0362708 A1 * | 12/2015 | Lee ........................ G02B 13/04 |
| | | 359/708 |

(Continued)

FOREIGN PATENT DOCUMENTS

| CN | 106249387 B | 1/2014 |
| TW | I420136 B | 12/2013 |

(Continued)

*Primary Examiner* — Mahidere S Sahle
(74) *Attorney, Agent, or Firm* — Muncy, Geissler, Olds & Lowe, P.C.

(57) ABSTRACT

A fixed focus lens includes a first lens group with a negative refractive power, an aperture stop, and a second lens group with a positive refractive power arranged in order from a first side to a second side. The first lens group has at least two lenses including at least one aspheric lens. The second lens group includes at least five lenses, the at least five lenses comprising a first compound lens and a second compound lens. A difference between a maximum Abbe number and a minimum Abbe number for all lenses of the first compound lens is greater than 50, and a difference between a maximum Abbe number and a minimum Abbe number for all lenses of the second compound lens is greater than 45.

19 Claims, 3 Drawing Sheets

(56) References Cited

U.S. PATENT DOCUMENTS

2017/0184823 A1\* 6/2017 Jiang ................ G02B 13/06
2019/0302428 A1\* 10/2019 Chen ................ G02B 5/005

FOREIGN PATENT DOCUMENTS

TW  201807452 A  3/2018
WO  WO-2005111688 A1 \* 11/2005  ............ G02B 13/04
WO  WO 2018/150522 A1  8/2018

\* cited by examiner

FIXED FOCUS LENS

BACKGROUND OF THE INVENTION a. Field of the Invention

The invention relates generally to an optical system, and more particularly to a fixed focus lens.

b. Description of the Related Art

Typically, a conventional projection lens has six to eight lenses with refractive powers. Besides, several aspheric lenses may be used in the projection lens to achieve large effective apertures, low distortion and low chromatic aberration in a limited layout space.

However, considering the surface complexity and dimensional tolerances of aspheric surfaces, the optical matching among various surfaces of all aspheric lenses requires extremely high precision. Therefore, a greater number of aspheric lenses may reduce production yields, complicate fabrication processes and increase fabrication costs.

BRIEF SUMMARY OF THE INVENTION

According to one aspect of the present disclosure, a fixed focus lens includes a first lens group with a negative refractive power, an aperture stop, and a second lens group with a positive refractive power arranged in order from a first side to a second side. The first lens group has at least two lenses including at least one aspheric lens, and a lens of the first lens group closest to the first side has a negative refractive power. The second lens group includes at least five lenses, the at least five lenses comprising a first compound lens and a second compound lens, a difference between a maximum Abbe number and a minimum Abbe number for all lenses of the first compound lens is greater than 50, and a difference between a maximum Abbe number and a minimum Abbe number for all lenses of the second compound lens is greater than 45. The fixed focus lens is capable of performing a whole group focusing operation during focusing, a total number of all lenses of the fixed focus lens is no more than ten, and a total number of aspheric lenses of the fixed focus lens is no more than three. Accordingly, by controlling the number of aspheric surfaces in the fixed focus lens, the fabrication costs can be reduced without lowering the overall optical performance.

According to another aspect of the present disclosure, a fixed focus lens includes a first lens, a second lens, a third lens, a fourth lens, a fifth lens, a sixth lens, a seventh lens, an eighth lens and a ninth lens arranged in order from a magnified side to a minified side. The first lens has at least one aspheric surface, and the fourth lens, the fifth lens, the sixth lens, the seventh lens, the eighth lens and the ninth lens comprise at least two cemented lenses. A total number of lenses with refractive powers of the fixed focus lens is no more than ten, a total number of plastic lenses of the fixed focus lens is no more than three, and a distance between any two lenses of the fixed focus lens keeps fixed during focusing. Accordingly, by controlling the number of aspheric surfaces in a fixed focus lens, the fabrication costs can be reduced without lowering the overall optical performance.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.). The following embodiments of a fixed focus lens may be applied to any system or environment according to actual demands.

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an optical projection system, an image minified side (or a minified side) may refer to one side of an optical path of a fixed focus lens comparatively near a light valve or a spatial light modulator, and an image magnified side (or a magnified side) is opposite the image minified side and may refer to other side of the optical path comparatively near a projected image.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
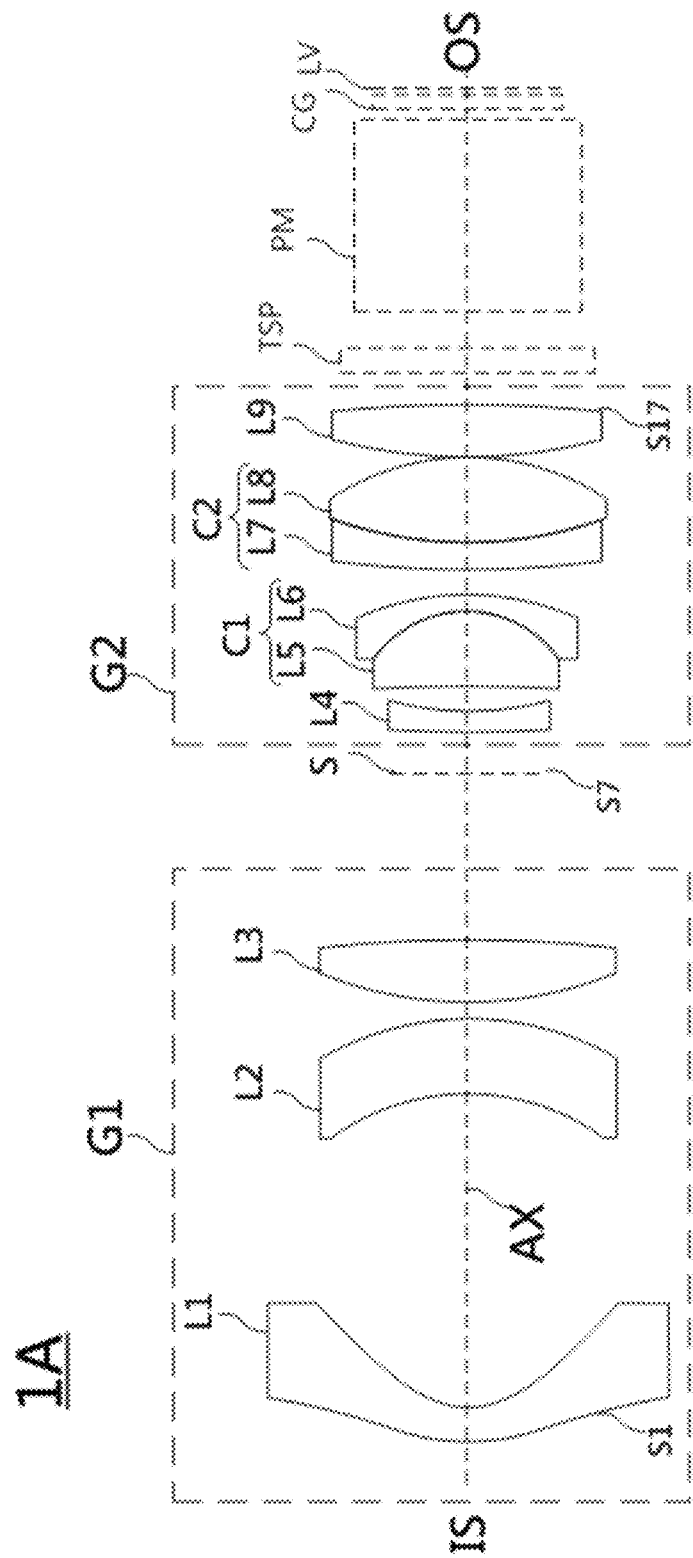
FIG. 1 shows a cross-sectional illustration of a fixed focus lens according to an embodiment of the invention.

FIG. 1 shows a cross-sectional illustration of a fixed focus lens according to an embodiment of the invention. As shown in FIG. 1, in this embodiment, a fixed focus lens 1A has a lens barrel (not shown) that accommodates multiple lenses.

More specifically, in this embodiment, the fixed focus lens 1A may achieve good, better and best cost-effectiveness when the total number of lenses with refractive powers is 20, 15, and 10 or less, respectively. In this embodiment, nine lenses L1-L9 with refractive powers are provided and arranged in order from a first side (magnified side IS) to a second side (minified side OS).

The fixed focus lens 1A includes a first lens group G1 (such as a front lens group) with a negative refractive power and a second lens group G2 (such as a rear lens group) with a positive refractive power separated by an aperture stop S. The first lens group G1 includes three lenses, and the second lens group G2 includes six lenses. In this embodiment, the refractive powers of the first lens L1 to the ninth lens L9 are negative, negative, positive, negative, positive, negative, negative, positive and positive, respectively. In this embodiment, the first lens L1 to the ninth lens L9 have respective shapes of meniscus, meniscus, biconvex, meniscus, meniscus, meniscus, meniscus, biconvex and biconvex, respectively. The first lens L1 and the second lens L2 are plastic aspheric lenses, and other lenses L3-L9 are glass spherical lenses. In one embodiment, the uses of plastic aspheric lenses and glass aspheric lenses are interchangeable, and the uses of plastic spherical lenses and glass spherical lenses are interchangeable.

The fixed focus lens 1A may have at least one compound lens such as a doublet lens or a triplet lens. As shown in FIG. 1, in this embodiment, the second lens group G2 includes two doublet lenses, and each doublet lens includes two lenses with refractive powers. Note that adjoining surfaces, either spherical surfaces or aspheric surfaces, of each two adjacent lenses in a doublet lens (including two lenses with refractive powers) or a triplet lens (including three lenses with refractive powers) have a completely identical, a substantially identical or a similar (a difference of smaller than 0.005 mm) radius of curvature and can be fit together by adhesive or mechanical pieces. In this embodiment, two lenses of each of the doublet lenses C1 and C2 in the second lens group G2 are cemented together by applying an optical adhesive to form a cemented doublet.

Moreover, the fixed focus lens 1A, during focusing, performs a "whole group focusing" operation; that is, the distance between any two elements of the aperture stop S and the lenses L1-L9 remains fixed during focusing. Alternatively, the lenses L1-L9 and the aperture stop S move together without any displacement relative to each other in the whole group focusing operation. The minified side IS of the fixed focus lens 1A may be disposed with an image displacement module TSP, a prism PM, a cover glass CG and a light valve LV.

An image plane of the fixed focus lens 1A formed at an effective focal length for visible light is provided on a surface of the light valve LV.

The aperture stop S may be an independent component or integrally formed with other optical element. In this embodiment, the aperture stop S may use a mechanic piece to block out peripheral light and transmit central light to achieve aperture effects. The mechanic piece may be adjusted by varying its position, shape or transmittance. In other embodiment, the aperture stop S may be formed by applying an opaque or a light-absorbing material on a lens surface except for a central area to block out peripheral light and transmits central light.

Tables 1 and 2 list design parameters, lens shapes and aspheric coefficients of the fixed focus lens 1A.

TABLE 1

F/# = 1.7; EFL = 12.77(mm); TTL = 114.7(mm); LT = 88.3(mm); IMH = 7.803 (mm); TR = 1.224

| surface | radius of curvature (mm) | interval (mm) | refractive index | Abbe number | object description |
|---|---|---|---|---|---|
| S1* | 11.298 | 3.574 | 1.53 | 56.3 | L1 |
| S2* | 5.600 | 26.568 | | | |
| S3* | −16.848 | 6.497 | 1.53 | 56.3 | L2 |
| S4* | −20.327 | 1.107 | | | |
| S5 | 30.115 | 5.342 | 1.76 | 40.1 | L3 |
| S6 | −116.073 | 14.307 | | | |
| S7 | — | 3.476 | | | aperture stop S |
| S8 | 138.800 | 1.500 | 1.69 | 31.2 | L4 |
| S9 | 20.949 | 2.053 | | | |
| S10 | −539.096 | 6.417 | 1.5 | 81.6 | L5 |
| S11 | −9.688 | 1.512 | 1.81 | 25.5 | L6 |
| S12 | −23.489 | 2.030 | | | |

TABLE 1-continued

F/# = 1.7; EFL = 12.77(mm); TTL = 114.7(mm); LT = 88.3(mm); IMH = 7.803 (mm); TR = 1.224

| surface | radius of curvature (mm) | interval (mm) | refractive index | Abbe number | object description |
|---|---|---|---|---|---|
| S13 | 75.955 | 2.074 | 1.62 | 36.3 | L7 |
| S14 | 27.429 | 7.500 | 1.5 | 81.6 | L8 |
| S15 | −21.356 | 0.171 | | | |
| S16 | 45.616 | 4.209 | 1.85 | 23.8 | L9 |
| S17 | −188.927 | 2.982 | | | |
| S18 | | 2.000 | 1.52 | 64.2 | TSP |
| S19 | | 3.200 | | | TSP |
| S20 | | 16.000 | 1.73 | 28.3 | prism PM |
| S21 | | 0.800 | | | prism PM |
| S22 | | 1.100 | 1.51 | 61.2 | cover glass CG |
| S23 | | 0.303 | | | cover glass CG |
| S24 | | 0.000 | | | light valve LV |

In the above Table 1, an interval of the surface S1 is a distance between the surface S1 and the surface S2 along the optical axis AX, an interval of the surface S2 is a distance between the surface S2 and the surface S3 along the optical axis AX, and the remaining intervals are defined by analogy so that related descriptions are omitted for brevity.

In the above table 1, the surface denoted by an asterisk is an aspheric surface, and a surface without the denotation of an asterisk is a spherical surface. Further, the radius of curvature is a reciprocal of the curvature. When a lens surface has a positive radius of curvature, the center of the lens surface is located towards the minified side. When a lens surface has a negative radius of curvature, the center of the lens surface is located towards the magnified side. The concavity and convexity of each lens surface is listed in the above table and shown in corresponding figures.

The Symbol F/# shown in the above table is an F number of the fixed focus lens.

When the fixed focus lens is used in an optical projection system, the image plane is an active surface of the light valve, and the cover glass is a glass cover disposed on the light valve for protecting the active surface.

In the above table 1, IMH denotes a semi-diagonal image height on an image plane that equals half of an image circle.

In the above table 1, "LT" denotes a total lens length of the fixed focus lens 1A measured along the optical axis AX between the surface S1 closest to the magnified side IS and the surface S17 closest to the minified side OS. In one embodiment, the fixed focus lens 1A may achieve competent, good, better and best cost-effectiveness when the total lens length LT is greater than 5 mm and smaller than 1000 mm, 300 mm, 110 mm and 90 mm, respectively. In this embodiment, the total lens length LT of the fixed focus lens 1A is 88.3 mm.

In the above table 1, "TTL" denotes a total track length of the fixed focus lens 1A. Specifically, the total track length TTL is a distance along the optical axis AX between the surface S1 closest to the magnified side and the image plane. In one embodiment, the fixed focus lens 1A may achieve competent, good, better and best cost-effectiveness when the total track length TTL is greater than 5 mm and smaller than 1000 mm, 300 mm, 200 mm and 130 mm, respectively. In this embodiment, the total track length TTL of the fixed focus lens 1A is 114.7 mm.

In the above table 1, "TR" denotes a throw ratio of the fixed focus lens 1A. Specifically, the throw ratio is the ratio of a throw distance to a width of a projection screen, where the throw distance is a distance measured from an optical surface of the fixed focus lens closest to the magnified side to the projection screen. Typically, the value of the throw ratio is in inverse proportion to the magnification capability of a projection lens. Table 2 lists aspheric coefficients and conic constant of each aspheric surface of the fixed focus lens according to a first embodiment of the invention.

TABLE 2

|   | S1* | S2* | S3* | S4* |
|---|---|---|---|---|
| K | −8.121E−01 | −1.828E+00 | 1.776E−02 | −3.594E−01 |
| A | −2.861E−04 | 1.927E−04 | 3.817E−05 | 1.994E−05 |
| B | 1.316E−06 | −3.204E−06 | 1.850E−08 | 3.314E−09 |
| C | −4.388E−09 | 3.805E−08 | 5.510E−10 | 2.371E−10 |
| D | 8.532E−12 | −2.563E−10 | −4.154E−13 | −4.038E−13 |
| E | −8.013E−15 | 9.129E−13 | 6.539E−15 | 2.320E−15 |
| F | 1.695E−18 | −1.335E−15 | 0.000E+00 | 0.000E+00 |

In the following design examples of the invention, each aspheric surface satisfies the following equation:

$$Z = \frac{cr^2}{1 + \sqrt{1 - (1+k)c^2r^2}} + Ar^4 + Br^6 + Cr^8 + Dr^{10} + Er^{12} + Fr^{14} + \ldots,$$

where Z denotes a sag of an aspheric surface along the optical axis, c denotes a reciprocal of a radius of an osculating sphere, K denotes a Conic constant, r denotes a height of the aspheric surface measured in a direction perpendicular to the optical axis AX. Table 2 lists $4^{th}$, $6^{th}$, $8^{th}$ $10^{th}$, $12^{th}$ and $14^{th}$ order aspheric coefficients A-F of the fixed focus lens 1A. Note the data provided below are not used for limiting the invention, and those skilled in the art may suitably modify parameters or settings of the following embodiment with reference of the invention without departing from the scope or spirit of the invention.

In this embodiment, the fixed focus lens 1A may achieve good, better and best correction to chromatic aberration when a difference between Abbe numbers of two lenses in the doublet lens C1 is smaller than 70 and greater than 50, 55 and 60, respectively. Alternatively, the fixed focus lens 1A may achieve good, better and best correction to chromatic aberration when a difference between Abbe numbers of two lenses in the doublet lens C1 is in the range of 50-70, 55-65 and 55-60, respectively. In this embodiment, the difference between Abbe numbers of two lenses in the doublet lens C1 is about 56.

In this embodiment, the fixed focus lens 1A may achieve good, better and best correction to chromatic aberration when a difference between the maximum and the minimum Abbe numbers for all lenses of the doublet lens C2 is smaller than 70 and greater than 35, 40 and 45, respectively. Alternatively, the fixed focus lens 1A may achieve good, better and best correction to chromatic aberration when a difference between the maximum and the minimum Abbe numbers for all lenses of the doublet lens C2 is in the range of 35-70, 40-60 and 45-50, respectively. In this embodiment, the difference between the maximum Abbe number and the minimum Abbe number for the doublet lens C2 is about 45.3.

Typically, increasing the number of aspheric surfaces may exponentially increase the complexity of optical matching and assembly for a fixed focus lens. Therefore, in this embodiment, the fixed focus lens 1A may achieve good, better and best production efficiency and yields when the number of aspheric lenses is no more than 10, 8, 6 and 3, respectively. In this embodiment, the number of aspheric lenses of the fixed focus lens 1A is two. Alternatively, the fixed focus lens 1A may achieve competent, good, better, still better and best production efficiency and yields when a percentage is equal to 60, 50, 40, 30 and 20 or less, respectively, where the percentage is calculated as the ratio of the number of aspheric lenses to the total number of lenses with refractive powers of the fixed focus lens 1A.

According to the above embodiment, the aspheric surfaces are provided only on key portions of the fixed focus lens 1A to reduce the number of aspheric surfaces without lowering the optical performance. This may simplify fabrication processes, increase production yields and reduce fabrication costs.

Figure 2:
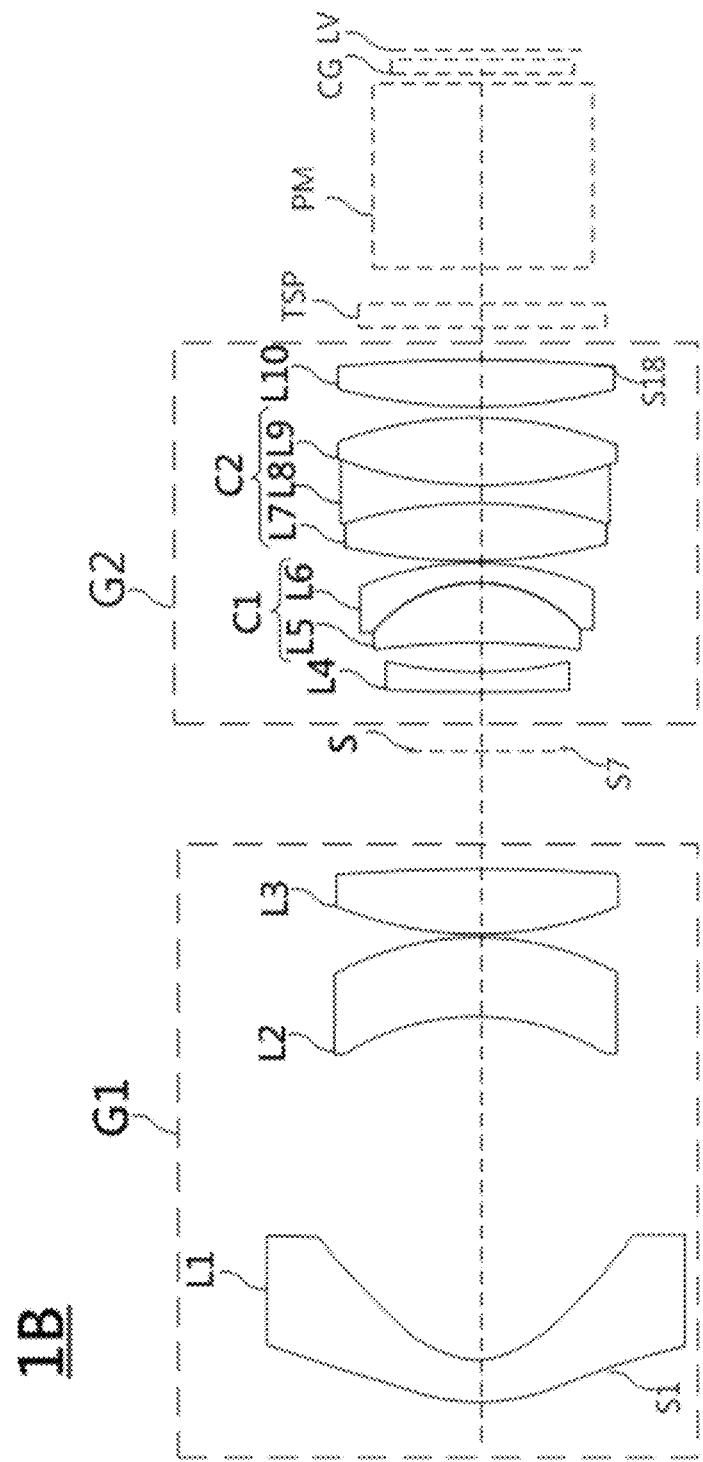
FIG. 2 shows a cross-sectional illustration of a fixed focus lens according to another embodiment of the invention.

FIG. 2 shows a cross-sectional illustration of a fixed focus lens according to a second embodiment of the invention. As shown in FIG. 2, in this embodiment, a fixed focus lens 1B includes a first lens group G1 (such as a front lens group) with a negative refractive power and a second lens group G2 (such as a rear lens group) with a positive refractive power separated by an aperture stop S. The first lens group G1 includes three lenses, and the second lens group G2 includes seven lenses. In this embodiment, the refractive powers of the first lens L1 to the tenth lens L10 are negative, negative, positive, negative, positive, negative, positive, negative, positive and positive, respectively. In this embodiment, the first lens L1 to the tenth lens L10 have respective shapes of meniscus, meniscus, biconvex, meniscus, meniscus, meniscus, meniscus, biconvex, biconcave and biconvex, respectively. The first lens L1 and the second lens L2 are plastic aspheric lenses, and other lenses L3-L10 are glass spherical lenses.

As shown in FIG. 2, the second lens group G2 has a doublet lens C1 including two lenses with refractive powers and a triplet lens C2 including three lenses with refractive powers. Note that, adjoining surfaces, either spherical surfaces or aspheric surfaces, of each two adjacent lenses in a doublet lens or a triplet lens have a completely identical, a substantially identical or a similar (a difference of smaller than 0.005 mm) radius of curvature. In this embodiment, two lenses of the doublet lens C1 in the second lens group G2 are cemented together to form a cemented doublet, and three lenses of the triplet lens C2 in the second lens group G2 are cemented together to form a cemented triplet.

Moreover, similar to the fixed focus lens 1A, the first lens group G1 and the second lens group G2 of the fixed focus lens 1B perform a whole group focusing operation during focusing.

Tables 3 and 4 list design parameters, lens shapes and aspheric coefficients of the fixed focus lens 1B. The definition of each design parameter has been described above with reference to Tables 1 and 2, thus not describing in detail here for brevity.

TABLE 3

F/# = 1.7; EFL = 12.77(mm); TTL = 111.9(mm); LT = 86.4(mm); IMH = 7.803 (mm); TR = 1.224

| surface | radius of curvature (mm) | interval (mm) | refractive index | Abbe number | object description |
|---|---|---|---|---|---|
| S1* | 11.610 | 3.421 | 1.53 | 56.28 | L1 |
| S2* | 5.783 | 28.656 | | | |
| S3* | −16.769 | 6.495 | 1.53 | 56.28 | L2 |
| S4* | −20.543 | 0.145 | | | |
| S5 | 27.484 | 5.548 | 1.75 | 35.02 | L3 |

TABLE 3-continued

F/# = 1.7; EFL = 12.77(mm); TTL = 111.9(mm); LT = 86.4(mm);
IMH = 7.803 (mm); TR = 1.224

| surface | radius of curvature (mm) | interval (mm) | refractive index | Abbe number | object description |
|---|---|---|---|---|---|
| S6  | −121.412 | 9.732  |      |       |                |
| S7  |          | 4.984  |      |       | aperture stop S |
| S8  | 759.339  | 1.497  | 1.76 | 27.55 | L4             |
| S9  | 25.832   | 2.485  |      |       |                |
| S10 | −73.117  | 5.197  | 1.50 | 81.59 | L5             |
| S11 | −10.067  | 1.497  | 1.76 | 27.55 | L6             |
| S12 | −21.696  | 0.145  |      |       |                |
| S13 | 43.397   | 4.736  | 1.62 | 60.37 | L7             |
| S14 | −34.356  | 1.513  | 1.73 | 28.31 | L8             |
| S15 | 28.621   | 5.743  | 1.50 | 81.59 | L9             |
| S16 | −28.683  | 0.761  |      |       |                |
| S17 | 43.091   | 3.824  | 1.92 | 18.90 | L10            |
| S18 | −158.409 | 2.110  |      |       |                |
| S19 |          | 2.000  | 1.52 | 64.20 | TSP            |
| S20 |          | 3.200  |      |       | TSP            |
| S21 |          | 16.000 | 1.73 | 28.30 | prism PM       |
| S22 |          | 0.800  |      |       | prism PM       |
| S23 |          | 1.100  | 1.51 | 61.20 | cover glass CG |
| S24 |          | 0.303  |      |       | cover glass CG |
| S25 |          | 0.000  |      |       | light valve LV |

As shown in Table 3, a difference between the maximum and the minimum Abbe numbers for two lenses L5 and L6 of the doublet lens C1 is about 54.04, and a difference between the maximum and the minimum Abbe numbers for three lenses L7, L8 and L9 of the triplet lens C2 is about 53.28.

Table 4 lists aspheric coefficients and conic constant of each aspheric surface of the fixed focus lens 1B according to the second embodiment of the invention.

TABLE 4

|   | S1* | S2* | S3* | S4* |
|---|---|---|---|---|
| K | −8.121E−01 | −1.828E+00 | 1.776E−02  | −3.594E−01 |
| A | −2.861E−04 | 1.927E−04  | 3.817E−05  | 1.994E−05  |
| B | 1.316E−06  | −3.204E−06 | 1.850E−08  | 3.314E−09  |
| C | −4.388E−09 | 3.805E−08  | 5.510E−10  | 2.371E−10  |
| D | 8.532E−12  | −2.563E−10 | −4.154E−13 | −4.038E−13 |
| E | −8.013E−15 | 9.129E−13  | 6.539E−15  | 2.320E−15  |
| F | 1.695E−18  | −1.335E−15 | 0.000E+00  | 0.000E+00  |

Figure 3:
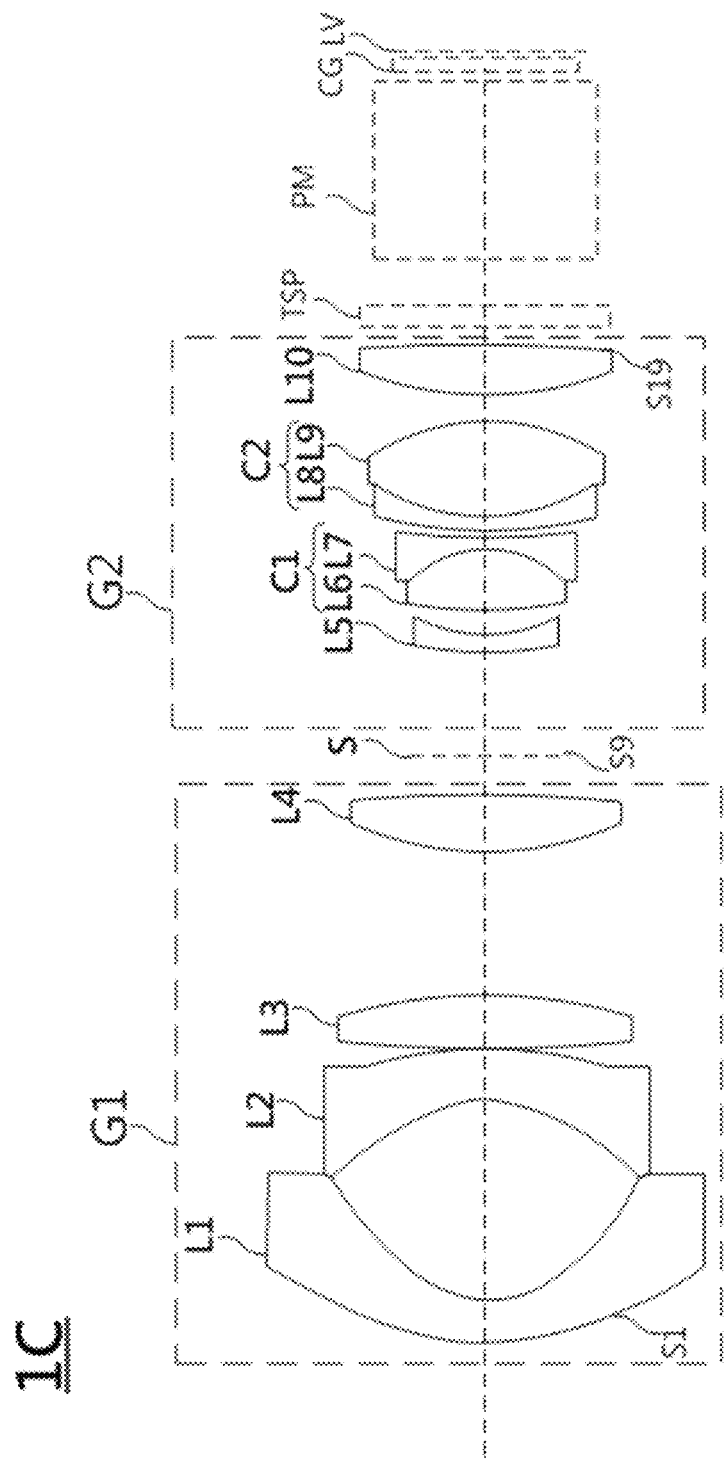
FIG. 3 shows a cross-sectional illustration of a fixed focus lens according to another embodiment of the invention.

FIG. 3 shows a cross-sectional illustration of a fixed focus lens according to a third embodiment of the invention. As shown in FIG. 3, in this embodiment, a fixed focus lens 1C includes a first lens group G1 (such as a front lens group) with a negative refractive power and a second lens group G2 (such as a rear lens group) with a positive refractive power separated by an aperture stop S. The first lens group G1 includes four lenses, and the second lens group G2 includes six lenses. In this embodiment, the refractive powers of the first lens L1 to the tenth lens L10 are negative, negative, positive, positive, negative, positive, negative, negative, positive and positive, respectively. In this embodiment, the first lens L1 to the tenth lens L10 have respective shapes of meniscus, meniscus, biconvex, biconvex, meniscus, biconvex, biconcave, meniscus, biconvex and biconvex, respectively. The first lens L1 and the second lens L2 are plastic aspheric lenses, and other lenses L3-L10 are glass spherical lenses.

As shown in FIG. 3, the second lens group G2 includes two doublet lenses C1 and C2 each including two lenses with refractive powers. Note that, adjoining surfaces, either spherical surfaces or aspheric surfaces, of each two adjacent lenses in a doublet lens have a completely identical, a substantially identical or a similar (a difference of smaller than 0.005 mm) radius of curvature. In this embodiment, two lenses of each doublet lens in the second lens group G2 are cemented together to form a cemented doublet.

Moreover, similar to the fixed focus lens 1A, the first lens group G1 and the second lens group G2 of the fixed focus lens 1C perform a whole group focusing operation during focusing.

TABLE 5

F/# = 1.7; EFL = 12.77(mm); TTL = 114.1(mm); LT = 88.3(mm); IMH = 7.803 (mm); TR = 1.224

| surface | radius of curvature (mm) | interval (mm) | refractive index | Abbe number | object description |
|---|---|---|---|---|---|
| S1*  | 17.92   | 3.757  | 1.53 | 56.3 | L1 |
| S2*  | 7.97    | 17.790 |      |      |    |
| S3*  | −10.66  | 4.448  | 1.53 | 56.3 | L2 |
| S4*  | −23.24  | 0.150  |      |      |    |
| S5   | 157.67  | 4.438  | 1.76 | 27.5 | L3 |
| S6   | −44.64  | 12.757 |      |      |    |
| S7   | 28.34   | 5.041  | 1.74 | 44.8 | L4 |
| S8   | −198.66 | 11.903 |      |      |    |
| S9   |         | 0.931  |      |      | aperture stop S |
| S10  | 31.14   | 1.500  | 1.85 | 23.8 | L5 |
| S11  | 14.21   | 2.357  |      |      |    |
| S12  | 69.62   | 5.318  | 1.5  | 81.5 | L6 |
| S13  | −9.41   | 1.000  | 1.76 | 26.5 | L7 |
| S14  | 151.71  | 0.519  |      |      |    |
| S15  | 42.59   | 1.461  | 1.72 | 29.5 | L8 |
| S16  | 19.08   | 8.228  | 1.62 | 60.3 | L9 |
| S17  | −19.08  | 2.499  |      |      |    |
| S18  | 35.33   | 4.206  | 1.92 | 18.9 | L10 |
| S19  | −170.81 | 1.613  |      |      |    |
| S20  |         | 2.000  | 1.52 | 64.2 | TSP |
| S21  |         | 4.000  |      |      | TSP |
| S22  |         | 16.000 | 1.73 | 28.3 | prism PM |
| S23  |         | 0.800  |      |      | prism PM |
| S24  |         | 1.100  | 1.51 | 61.2 | cover glass CG |
| S25  |         | 0.303  |      |      | cover glass CG |
| S26  |         | 0.000  |      |      | light valve LV |

Tables 5 and 6 list design parameters, lens shapes and aspheric coefficients of the fixed focus lens 1C. The definition of each design parameter has been described above with reference to Tables 1 and 2, thus not describing in detail here for brevity.

As shown in Table 5, a difference between the maximum and the minimum Abbe numbers for two lenses L5 and L6 of the doublet lens C1 is about 55, and a difference between the maximum and the minimum Abbe numbers for two lenses L8 and L9 of the doublet lens C2 is about 30.8.

Table 6 lists aspheric coefficients and conic constant of each aspheric surface of the fixed focus lens 1C according to the third embodiment of the invention.

TABLE 6

|   | S1* | S2* | S3* | S4* |
|---|---|---|---|---|
| K | −6.080E−01 | −2.046E+00 | −5.253E−01 | −2.555E+00 |
| A | −1.464E−04 | 8.164E−05  | 1.318E−04  | 7.618E−05  |
| B | 9.184E−07  | −5.372E−07 | −1.305E−08 | −6.011E−08 |
| C | −3.990E−09 | 1.087E−08  | 8.832E−10  | 1.538E−10  |
| D | 1.154E−11  | −9.903E−11 | −5.757E−12 | −2.545E−12 |
| E | −1.992E−14 | 5.091E−13  | 1.889E−14  | 7.471E−15  |
| F | 1.502E−17  | −1.120E−15 | 0.000E+00  | 0.000E+00  |

TABLE 7

| Fixed focus lens | F# | Throw ratio | EFL (mm) | TTL (mm) | LT (mm) | IMH (mm) | TTL/ EFL | LT/ EFL | EFL/ IMH |
|---|---|---|---|---|---|---|---|---|---|
| 1A | 1.7 | 1.224 | 12.77 | 114.7 | 88.3 | 7.803 | 8.984 | 6.915 | 1.637 |
| 1B | 1.7 | 1.224 | 12.77 | 111.9 | 86.4 | 7.803 | 8.763 | 6.766 | 1.637 |
| 1C | 1.7 | 1.224 | 12.77 | 114.1 | 88.3 | 7.803 | 8.935 | 6.915 | 1.637 |

Table 7 lists lens parameters and characteristic ratios of the first, second and third embodiments. In one embodiment, the fixed focus lens may achieve competent, good, better and best optimized proportion of components when the ratio EFL/LT is smaller than 30 and greater than 1, 3, 5 and 6, respectively, where EFL denotes an effective focal length of the fixed focus lens. In one embodiment, the fixed focus lens may achieve competent, good, better and best performance when the ratio EFL/IMH is smaller than 10, 7, 5 and 3, respectively.

According to the above embodiments, the aspheric surfaces are provided only on key portions of the fixed focus lens to reduce the number of aspheric surfaces without lowering the overall optical performance. Therefore, the fixed focus lens may achieve good imaging quality and reduced fabrication costs.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. A fixed focus lens, comprising:
    a first lens, a second lens, a third lens, a fourth lens, a fifth lens, a sixth lens, a seventh lens, an eighth lens and a ninth lens arranged in order from a magnified side to a minified side, the first lens having at least one aspheric surface, the fourth lens, the fifth lens, the sixth lens, the seventh lens, the eighth lens and the ninth lens comprising at least two compound lenses, wherein a total number of lenses with refractive powers of the fixed focus lens is no more than ten, a total number of plastic lenses of the fixed focus lens is no more than three, and a distance between any two lenses of the fixed focus lens keeps fixed during focusing; and
    an aperture stop disposed between the third lens and the fourth lens, wherein a number of lenses with refractive powers disposed between the aperture stop and the magnified side is three or four, and the three or four lenses disposed between the aperture stop and the magnified side include a spherical lens with a positive refractive power and two aspheric lenses.

2. The fixed focus lens as claimed in claim 1, wherein each of the compound lenses is a cemented doublet or a cemented triplet.

3. The fixed focus lens as claimed in claim 1, wherein an F number of the fixed focus lens is smaller than or equal to 2.4.

4. The fixed focus lens as claimed in claim 1, wherein a number of glass spherical lenses of the fixed focus lens is six or more than six.

5. The fixed focus lens as claimed in claim 1, wherein a number of aspheric lenses of the fixed focus lens is two.

6. The fixed focus lens as claimed in claim 1, wherein a total lens length of the fixed focus lens measured from a lens surface closest to the magnified side to a lens surface closest to the minified side is between 5 mm and 110 mm.

7. The fixed focus lens as claimed in claim 1, wherein a total track length of the fixed focus lens measured from a lens surface closest to the magnified side to an image plane is between 5 mm and 130 mm.

8. The fixed focus lens as claimed in claim 1, wherein the fixed focus lens satisfies one of the following conditions:
    (1) the optical lens has nine lenses with refractive powers of negative, negative, positive, negative, positive, negative, negative, positive and positive;
    (2) the optical lens has ten lenses with refractive powers of negative, negative, positive, negative, positive, negative, positive, negative, positive and positive;
    (3) the optical lens has ten lenses with refractive powers of negative, negative, positive, positive, negative, positive, negative, negative, positive and positive.

9. The fixed focus lens as claimed in claim 1, wherein the fixed focus lens satisfies the condition of EFL/IMH<3, where EFL denotes an effective focal length of the fixed focus lens, and IMH denotes a semi-diagonal image height.

10. The fixed focus lens as claimed in claim 1, wherein an overall refractive power of the first lens, the second lens and the third lens is a negative value.

11. The fixed focus lens as claimed in claim 1, wherein and an overall refractive power of the fourth lens, the fifth lens, the sixth lens, the seventh lens, the eighth lens and the ninth lens is a positive value.

12. The fixed focus lens as claimed in claim 1, wherein the at least two compound lenses comprises a first compound lens and a second compound lens, a difference between a maximum Abbe number and a minimum Abbe number for all lenses of the first compound lens is between 50 and 70, and a difference between a maximum Abbe number and a minimum Abbe number for all lenses of the second compound lens is between 45 and 70.

13. The fixed focus lens as claimed in claim 12, wherein an F number of the fixed focus lens is smaller than or equal to 2.4.

14. The fixed focus lens as claimed in claim 12, wherein a number of glass spherical lenses of the fixed focus lens is six or more than six.

15. The fixed focus lens as claimed in claim 12, wherein a number of aspheric lenses of the fixed focus lens is two.

16. The fixed focus lens as claimed in claim 12, wherein a total lens length of the fixed focus lens measured from a lens surface closest to the magnified side to a lens surface closest to the minified side is between 5 mm and 110 mm.

17. The fixed focus lens as claimed in claim 12, wherein a total track length of the fixed focus lens measured from a lens surface closest to the magnified side to an image plane is between 5 mm and 130 mm.

18. The fixed focus lens as claimed in claim 12, wherein the fixed focus lens satisfies one of the following conditions:
    (1) the optical lens has nine lenses with refractive powers of negative, negative, positive, negative, positive, negative, negative, positive and positive;
    (2) the optical lens has ten lenses with refractive powers of negative, negative, positive, negative, positive, negative, positive, negative, positive and positive;

(3) the optical lens has ten lenses with refractive powers of negative, negative, positive, positive, negative, positive, negative, negative positive and positive.

19. The fixed focus lens as claimed in claim 12, wherein the fixed focus lens satisfies the condition of EFL/IMH<3, where EFL denotes an effective focal length of the fixed focus lens, and IMH denotes a semi-diagonal image height.

* * * * *